Nov. 5, 1935.  A. N. CLOUTIER  2,019,777
BRAIDING MACHINE
Filed Jan. 28, 1933  8 Sheets-Sheet 1

INVENTOR
Arthur N. Cloutier
BY
ATTORNEY

Nov. 5, 1935.  A. N. CLOUTIER  2,019,777

BRAIDING MACHINE

Filed Jan. 28, 1933   8 Sheets-Sheet 2

INVENTOR
Arthur N. Cloutier
BY Horatio E. Bellows
ATTORNEY

Nov. 5, 1935.  A. N. CLOUTIER  2,019,777
BRAIDING MACHINE
Filed Jan. 28, 1933  8 Sheets-Sheet 4

INVENTOR
Arthur N. Cloutier
BY Horatio E. Bellows
ATTORNEY

Nov. 5, 1935.  A. N. CLOUTIER  2,019,777
BRAIDING MACHINE
Filed Jan. 28, 1933   8 Sheets-Sheet 5

INVENTOR
Arthur N. Cloutier
BY Horatio E. Bellows
ATTORNEY

Nov. 5, 1935.   A. N. CLOUTIER   2,019,777
BRAIDING MACHINE
Filed Jan. 28, 1933    8 Sheets-Sheet 6

INVENTOR
Arthur N. Cloutier
BY Horatio E. Bellows
ATTORNEY

Nov. 5, 1935.  A. N. CLOUTIER  2,019,777
BRAIDING MACHINE
Filed Jan. 28, 1933   8 Sheets-Sheet 7
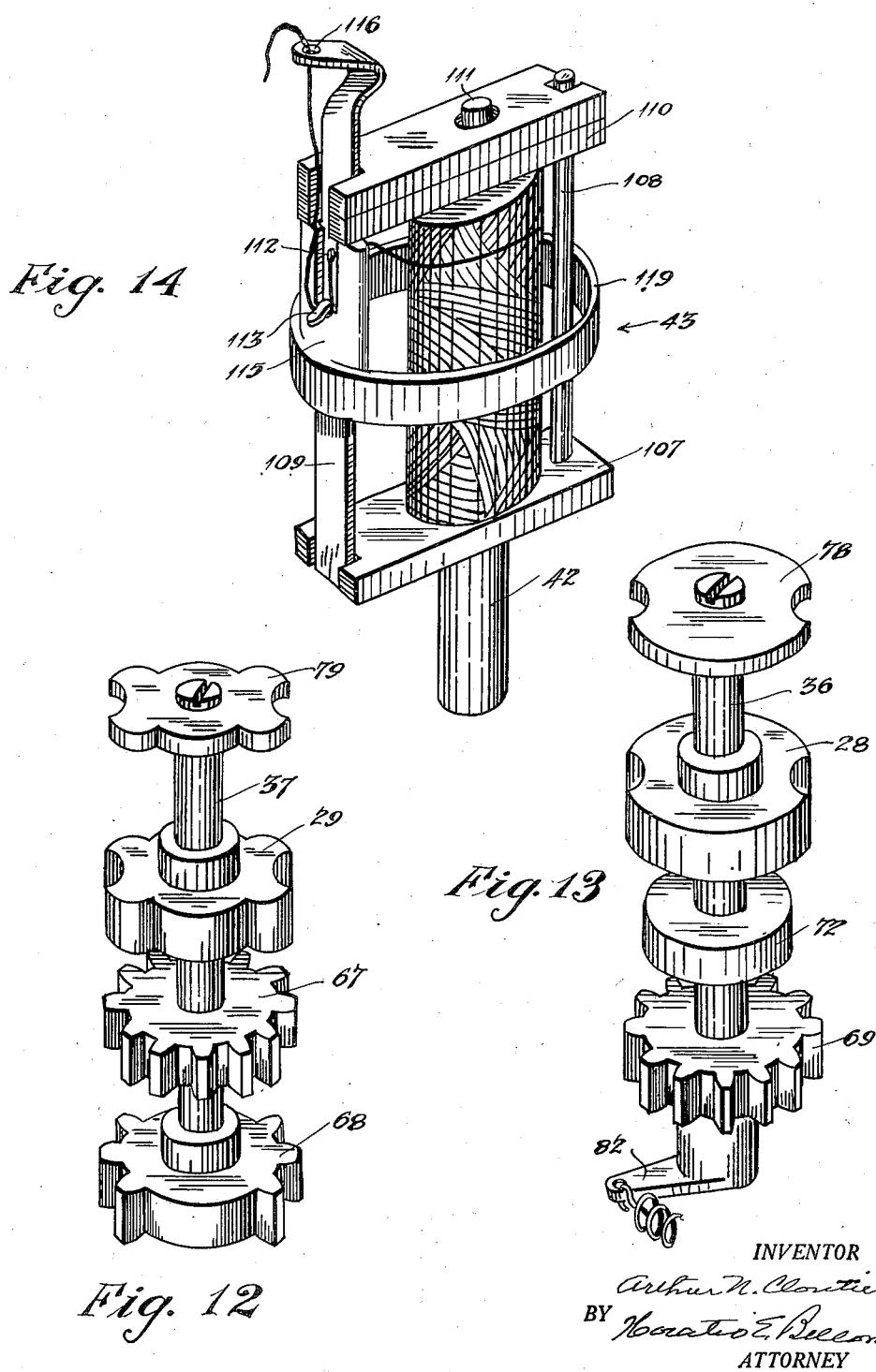
INVENTOR
Arthur N. Cloutier.
BY Horatio E. Bellows
ATTORNEY Nov. 5, 1935.  A. N. CLOUTIER  2,019,777
BRAIDING MACHINE
Filed Jan. 28, 1933      8 Sheets-Sheet 8

INVENTOR
Arthur N. Cloutier
BY Horatio E. Bellows
ATTORNEY

Patented Nov. 5, 1935

2,019,777

UNITED STATES PATENT OFFICE 2,019,777

BRAIDING MACHINE

Arthur N. Cloutier, Lonsdale, R. I.

Application January 28, 1933, Serial No. 653,945

5 Claims. (Cl. 96—11)

My present invention relates to braiding machines and has particular reference to braiding machines for the manufacture of either flat or tubular braids and tapes.

The braiding machines heretofore utilized have been suitable for manufacturing a wide variety of braided products, and have utilized threads, strands, and wires of different thicknesses, properties, and colors. The manner of braiding and the relative positioning of the threads has heretofore, however, been dependent on and established by the construction of the braider itself, and has been difficult to change or to modify, and particularly during the progress of the braiding operation.

It is the principal object of my invention to devise a braider construction of universal type, which will manufacture either flat or tubular braid, of standard or fancy mesh, and with different arrangement of the threads to provide predetermined designs, as desired. To this end, I have devised a simple mechanism for rotating the braid carriers, which may be readily changed to produce either flat or tubular braid, as desired, and I have further provided an automatic regulator which may be manually set for producing a predetermined design of the finished braid.

Since the accuracy of the finished design depends on the maintenance of a predetermined thread tension, it is an additional object of my invention to provide a control device of positive but sensitive action which will automatically maintain the threads at the desired uniform tension.

With the above and other objects and advantageous features in view, the invention consists of a novel arrangement of parts more fully described in the detailed description following, in conjunction with the accompanying drawings, and more specifically defined in the appended claims.

In the drawings:

Figs. 8 to 13 are perspective views of the individual drivers and their associated parts, Fig. 9 representing the drivers 24, 25 and 30;

Fig. 14 is a perspective view of a single carrier and its associated parts; and Figs. 15 and 15a, 16 and 16a, 17 and 17a, and 18 and 18a show typical braid constructions and the necessary regulator setting therefor.

The general arrangement

Figures 1, 1A:
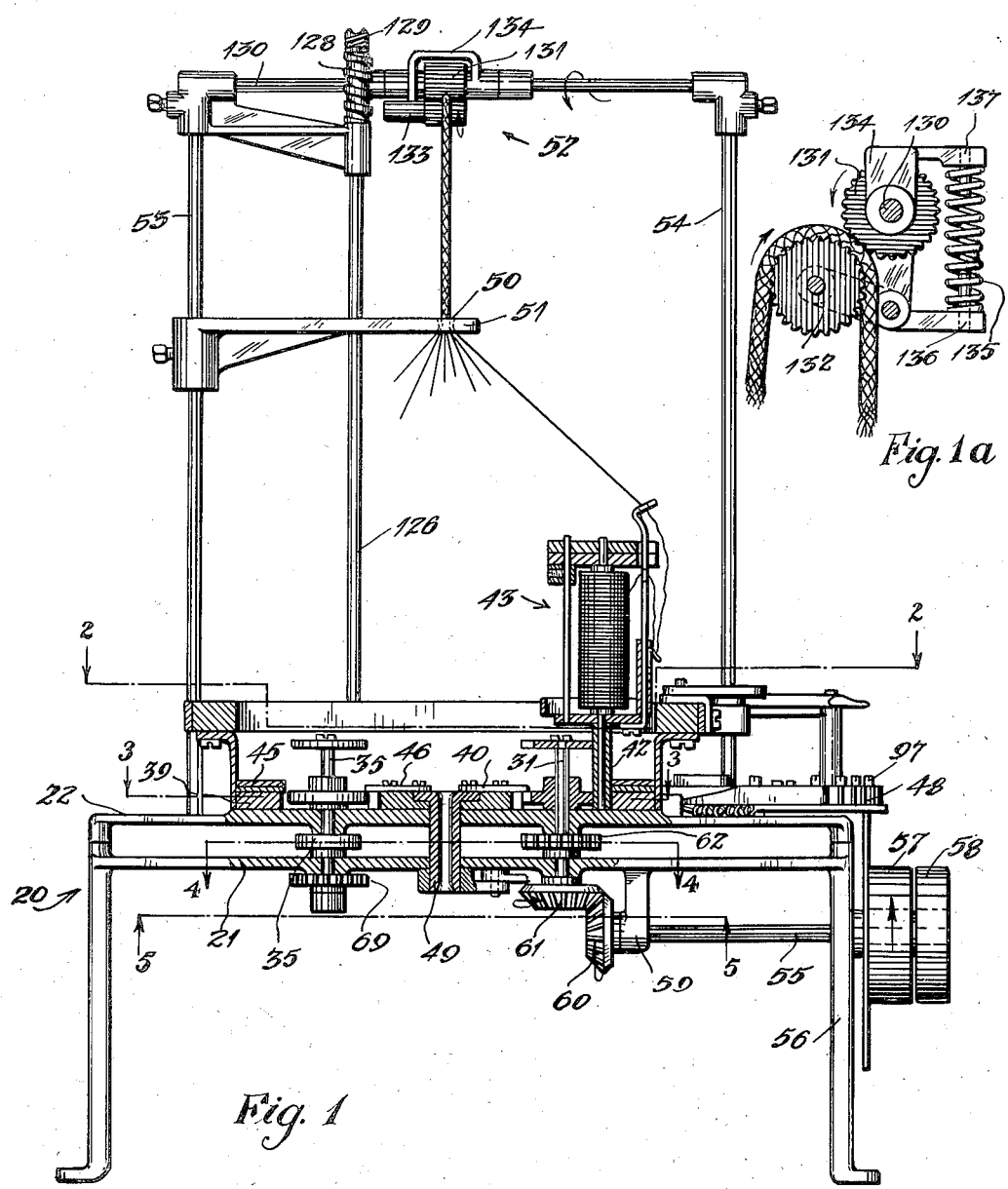
Fig. 1 is an elevation of the novel braiding machine, with parts in section.
Fig. 1a is a detail of the wind-up elements.
Figure 2:
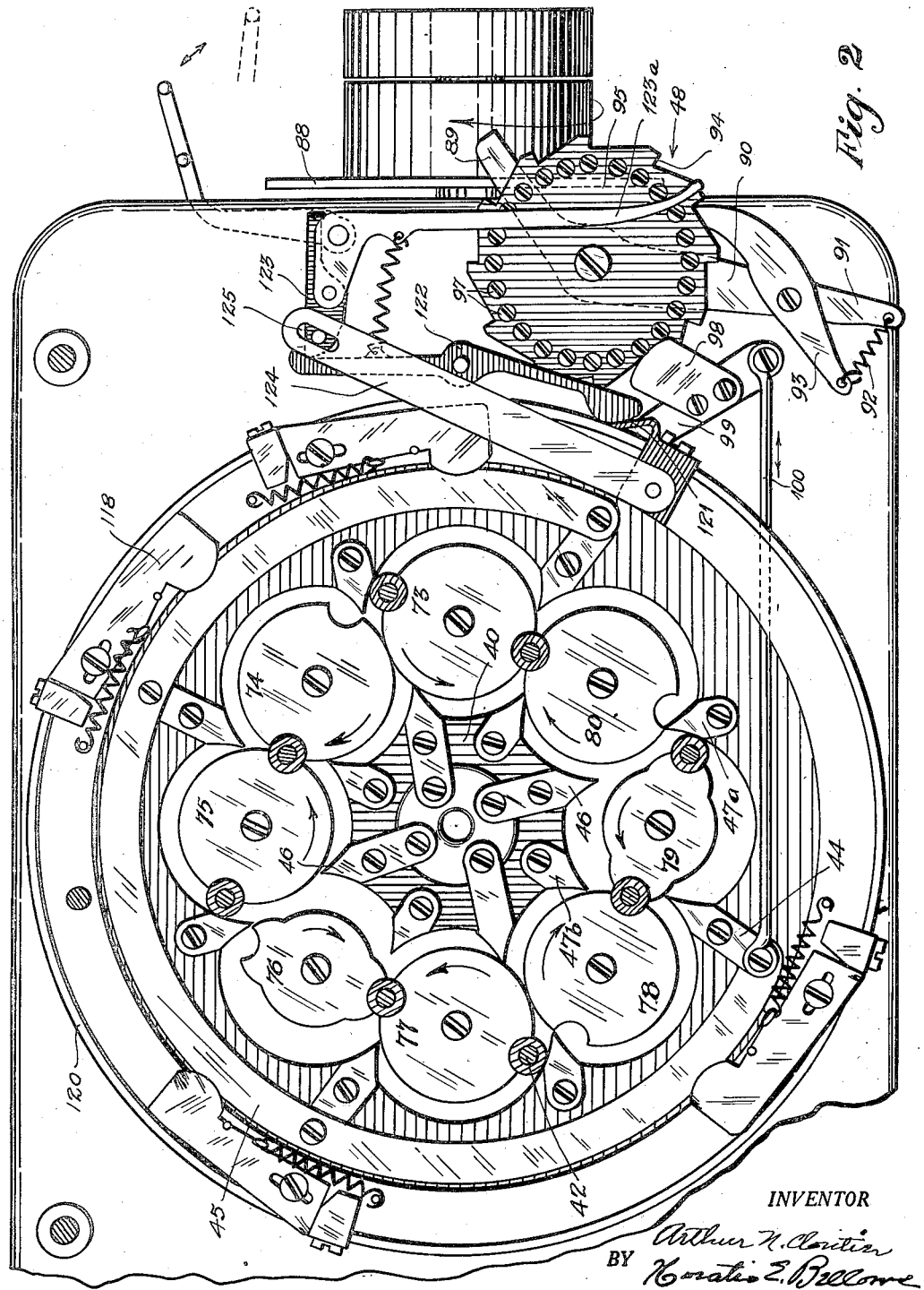
Fig. 2 is a view on the line 2—2 of Fig. 1.
Figure 3:
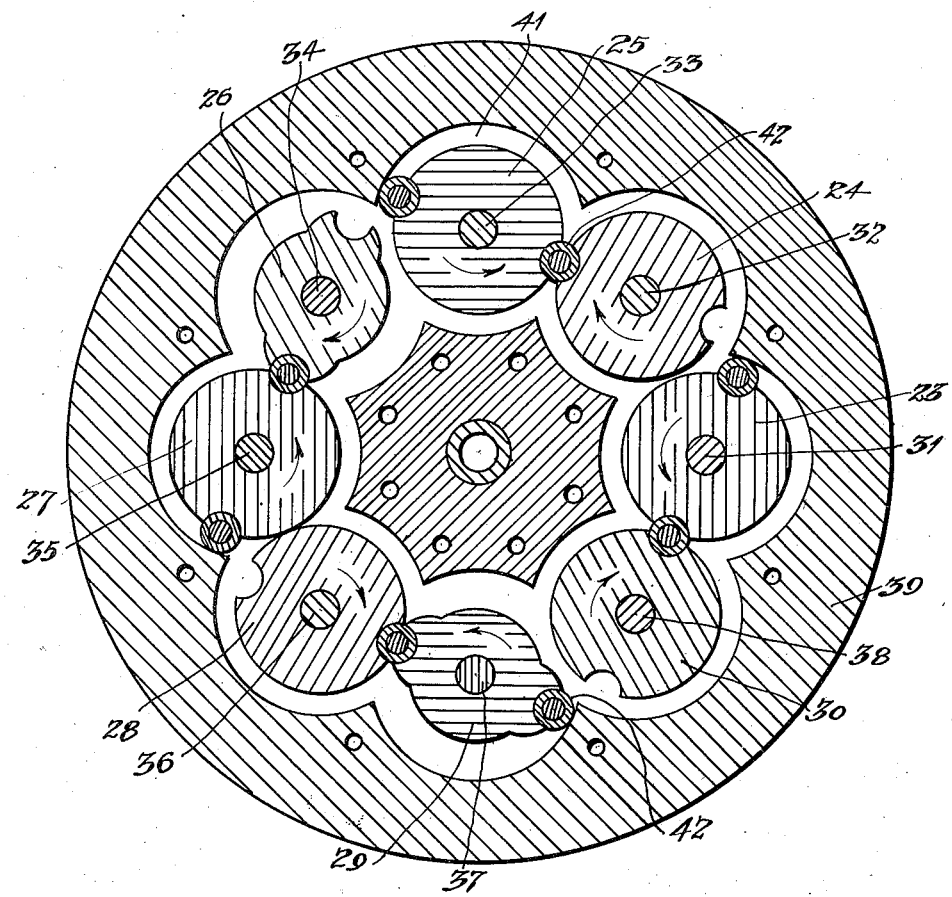
Fig. 3 is a section on the line 3—3 of Fig. 1.

The general arrangement of the novel apparatus is shown in Figs. 1 and 2, and comprises a base 20 which carries the actuating mechanism of the machine and which includes a bottom plate 21 and a top plate 22 spaced from the bottom plate, thus providing a housing for the driver gears. A plurality of drivers 23 to 30 are mounted on vertical driver shafts 31 to 38 which are circularly arranged on the base, and are journalled in the plates; the drivers cooperate with a fixed outer circular guide plate 39 which is secured to the top plate and with a fixed inner star shaped guide plate 40 to form a series of raceways 41 for the vertical shafts 42 of the thread carriers 43. The shafts 42 are guided in their movement in the raceways by a series of pivotally mounted outer switches 44 secured to an annular switch ring 45, as hereinafter described, and a series of pivotally mounted inner switches 46 secured to the inner guide plate 40; auxiliary gates 47a and 47b, which are similar in appearance and function like the switches, but are not positively actuated, are pivotally mounted on the annular switch ring 45 and the guide plate 40 between the pivoted switches. The movements of the switches 44 and 56 are controlled by a regulator mechanism 48, as hereinafter described, and the switches guide the carrier shafts and their carriers along predetermined paths.

As the carriers rotate in their selected paths, their threads are braided together; the base is provided with a rotatable central tubular conduit 49 through which a core or the like may be passed to be covered by the braid, and the braided threads pass through an opening 50 in a stationary closing device 51 of standard type and to a wind up mechanism 52, standards 53 and 54 being secured to the base to serve as supports to which the closing device and the wind up mechanism may be adjustably secured.

The carrier actuating mechanism

Referring now to Fig. 1, a power shaft 55 is supported beneath the bottom plate, one end being housed in one base standard or the like 56 and having the usual fixed and loose pulleys 57, 58 mounted thereon, and the other end being carried in a hanger bracket 59 depending from the bottom plate, this latter end having a bevel gear 60 keyed thereon which meshes with a co-acting bevel gear 61 keyed to the lower end of the driver shaft 31. The driver shaft 31 has a driver gear 62 thereon positioned intermediate the top and bottom plates, and this gear (see Fig. 4) is operatively connected to gears 63, 64, and 65 and to gears 66 and 67 which are in turn keyed to their respective driver shafts; the driver shafts 34, 35 and 36, (see Fig. 5) project downwardly through the bottom plate, and the shaft 34 has a mutilated gear 68 at the end thereof which meshes with a gear 69 at the lower end of shaft 35, the latter gear meshing with a gear 70 at the lower end of shaft 36. Two blank disks 71, 72 are preferably mounted on the shafts 35 and 36 intermediate the plates to balance the construction.

Referring now to Figs. 1, 2 and the perspective Figures 8 to 13, it will be noted that the driver shafts have guide plates 73 to 80 mounted at their upper ends and shaped in conformity with the corresponding drivers, the guide plates and the drivers both contacting the carrier shafts to rigidly support the carriers during their movements in the raceways; these drivers and plates, see Fig. 2, are generally circular in shape to permit the horns of the drivers to positively shift the carriers, but include two drivers and plates designated 26, 76, and 29, 79 respectively which are generally elliptical in shape to control dwell of the carriers in their respective raceways, if desired.

Figure 5:
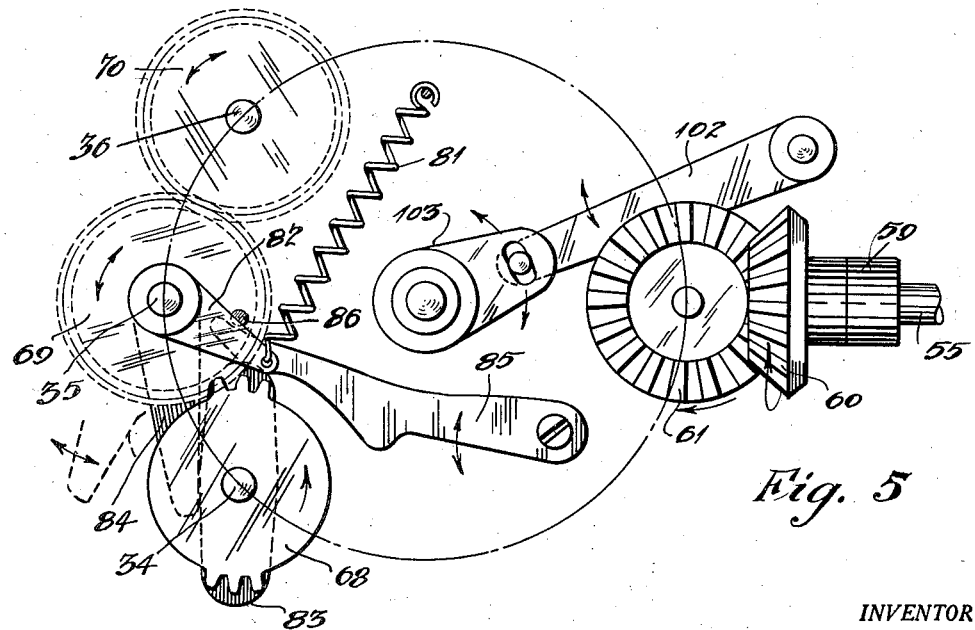
Fig. 5 is a bottom plan view on the line 5—5 of Fig. 1.
Figure 6:
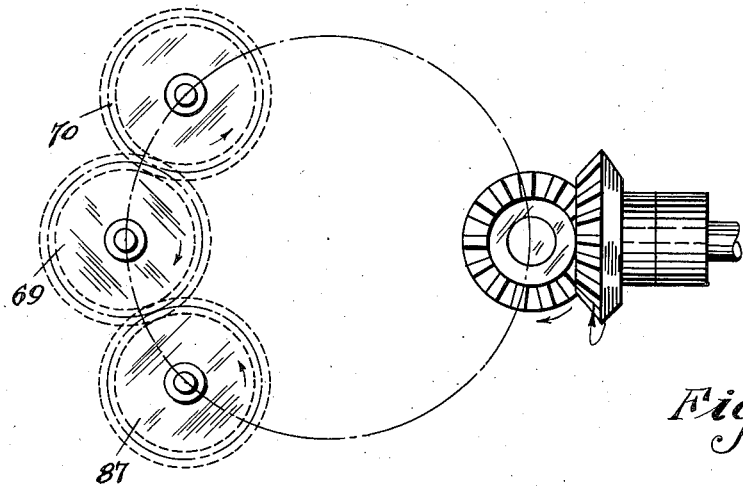
Fig. 6 is a view similar to Fig. 5, with the gears changed to produce tubular braid.

The above described mechanism is suitable for the formation of flat braid, as the carriers move in the usual sinuous path until drivers 26 and 29 are reached; the mutilated gear 68 then produces a dwell at these points, and the spring 81 acts on the shaft 35 through a crank 82 or the like to produce a partial reverse of the gears 69 and 70, see Fig. 5; and a reversal of travel of the carriers is thus obtained. Accurate meshing of the mutilated gear is obtained by forming the gear as shown in Fig. 5, with a lozenge shaped cam 83 which is periodically pressed against a lever 84 also keyed to the shaft 35, a second lever 85 being pivoted on the lower plate and resiliently pressed, as by spring 81, against a pin 86 on the gear 69. The spring is not essential to the operation, but produces a smoother action. If the manufacture of tubular braid is desired, the mutilated gear is replaced by a full gear 87, see Fig. 6; the rotation of the drivers then becomes continuous, and the drivers drive four carriers clockwise and four counterclockwise continuously without reversing.

*The design regulator mechanism*

The design regulator mechanism is best shown in Fig. 2, and comprises a rod or plate 88 which is attached to the fixed pulley and periodically engages the end 89 of a lever 90 which is pivotally mounted on the bottom plate, the other end 91 of the lever being resiliently connected, as by a spring 92, to one end of a pawl 93 pivoted on the lever; the other end of the pawl periodically engages the ratchet teeth 94 of a ratchet wheel 95 which is rotatably mounted on the bottom plate. The wheel 95 has a plurality of pin sockets 96 therein adapted to receive pins 97, and these pins contact a cam finger 98 secured to a switch lever 99 which controls the movements of the raceway switches. One end of the switch lever 99 has a rod 100 pivotally secured thereto, this rod being pivotally secured at its other end to the annular switch ring 45 to which the outer ends of the switches 44 are in turn pivoted; a shaft pin 101 is secured to the lever 99, see Fig. 7, to oscillate a lever 102, which in turn oscillates a crank 103 keyed to the central tubular conduit 49 through a lost motion slot and pin connection, the upper flange 104 of which serves as the base to which the ends of the inner switches 46 are pivoted.

Figure 7:
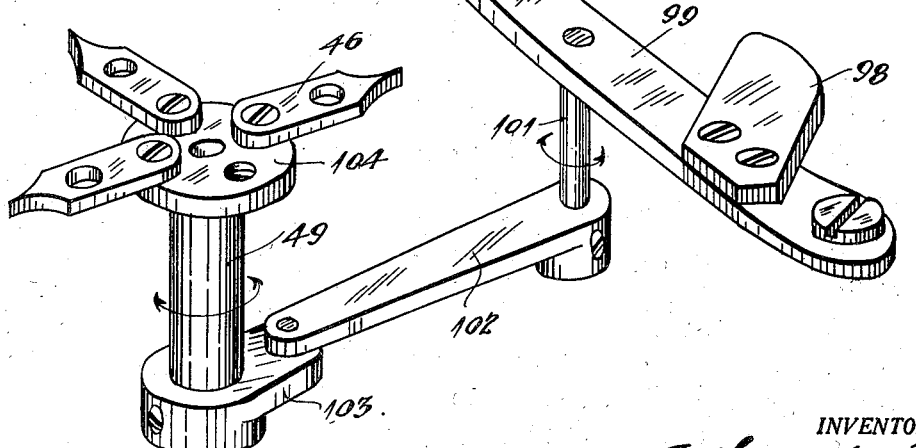
Fig. 7 is a perspective view showing the mechanism for operating the inner switches.
Figure 7A:
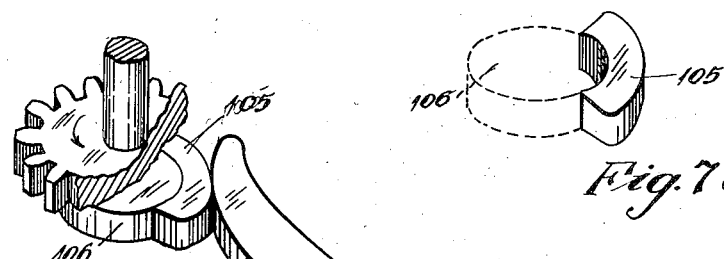
Fig. 7a is a perspective detail of the inner switch cam.
Figure 8:
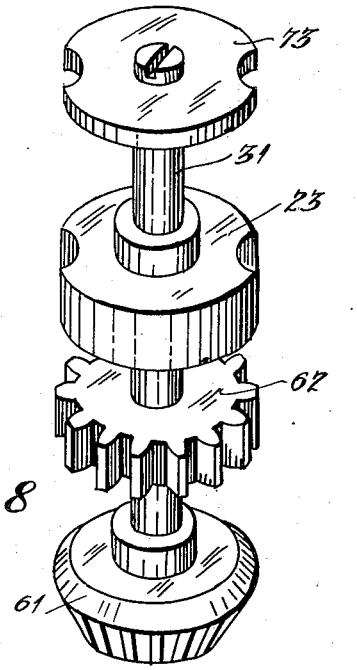
Figure 9:
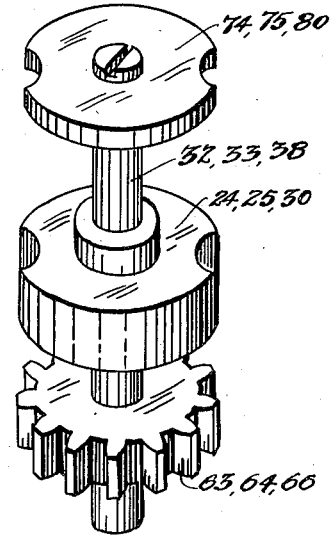
Figure 11:
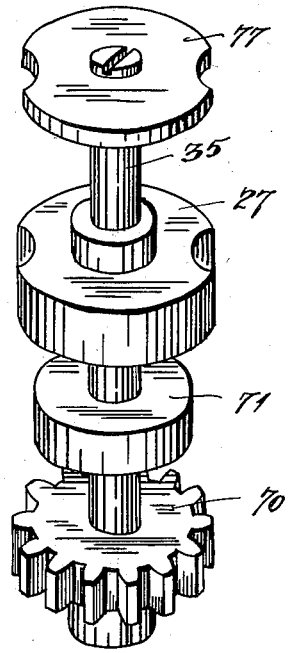
Figure 10:
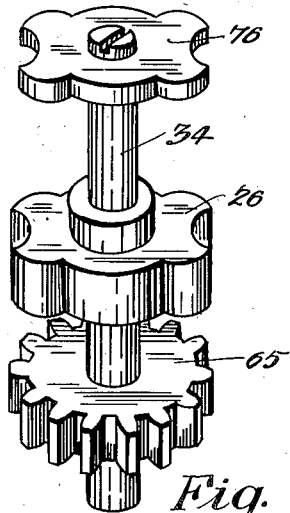

When manufacturing ordinary flat or tubular braid, the inner end of the lever 99 is preferably periodically actuated by a cam 105, see Figs. 7, 7a, 8 secured to the circular hub 106 of the gear 62 on driver shaft 31; when the regulator is being used to obtain fancy mesh or predetermined designs this cam is removed and the end of the lever 99 rides on the hub 106.

*The automatic tensioning and stop mechanism*

Each carrier, see Fig. 14, carries an automatic tensioning mechanism and a stop mechanism. The carrier shaft has a transverse plate 107, which has a round bar 108 and a flat bar 109 extending upwardly therefrom; weight plates 110 are mounted on the carrier spools, and have openings therethrough through which the reduced end 111 of the carrier shaft extends. The weight plates rest on the top of the thread spool and the thread passes through an opening 112 in the flat bar 109 and beneath a tongue 113 of a slide plate 115 which is reciprocatably mounted on the bar 108, and then through an opening 116 of the bent up end of the bar 109. As the thread tension increases, the thread pulls on the tongue 113 and lifts the slide plate, the latter in turn lifting the weight plates and thus reducing the tension.

Each slide plate has an annular ring 119 secured thereto; if the thread breaks, the slide plate and ring fall and the latter contacts one of the pivoted fingers 118, see Fig. 2, which are normally spring pressed inwardly, thus releasing the fingers to press the outer finger ends against stops 119 which are secured to an annular ring 120; the latter has a projection 121 which shifts a spring pressed latch lever 122 engaging a belt shift lever 123, and thus permits a lever 124 which is mounted on the body of the stop 121 and has a pin and slot connection 125 with the belt shift lever to shift the latter and stop the braider. The belt shift lever has a starting handle 123a, as shown in Fig. 2.

*The wind up mechanism*

Figure 4:
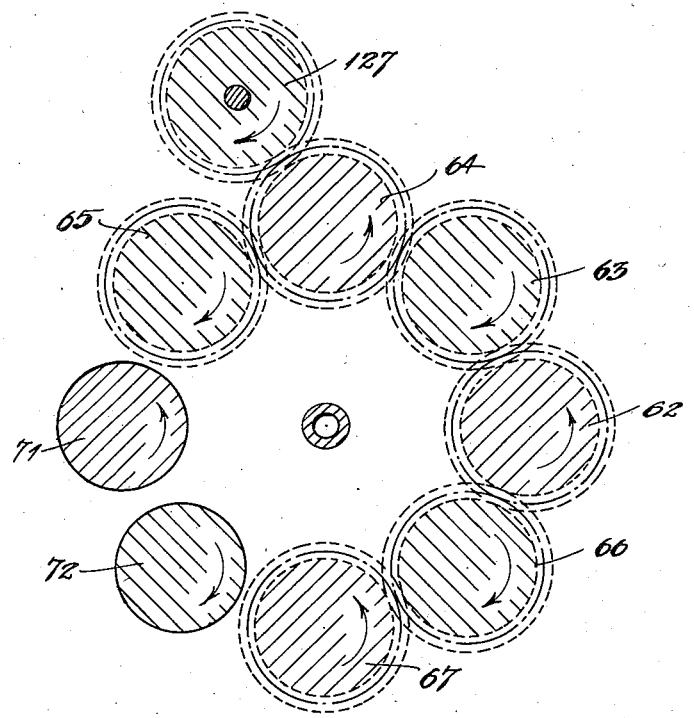
Fig. 4 is a section on the line 4—4 of Fig. 1.

The wind up mechanism 52, see Fig. 1a, includes a shaft 126 which has a gear 127 secured to the lower end thereof and in mesh with driver gear 64, see Fig. 4, the upper end of the shaft having a worm 128 thereon which meshes with a worm gear 129 to drive a cross shaft 130 on which a wind up roll 131 is keyed. A second wind up roll 132 is mounted in a bracket 133 pivoted to a second bracket 134 loosely secured on the cross shaft 130, and is resiliently pressed against the first wind up roll by a compression spring 135 mounted between two pins 136, 137 which are respectively secured to extensions of the two brackets.

*The designs*

Figure 15:
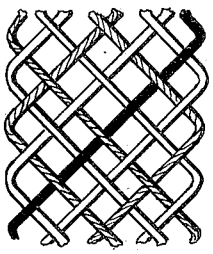
Figure 15A:
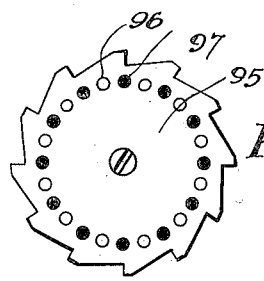
Figure 16:
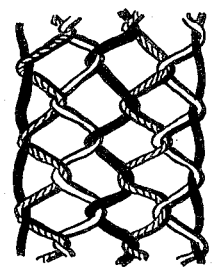
Figure 16A:
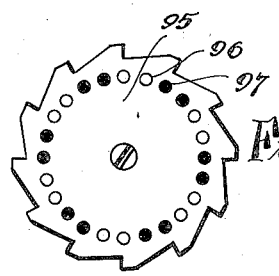
Figure 17:
Figure 17A:
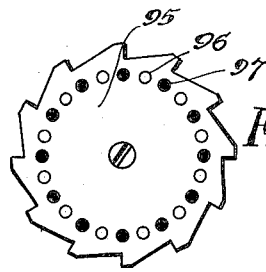
Figure 18:
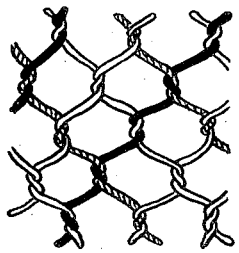
Figure 18A:
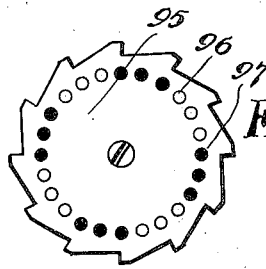

Predetermined designs are readily obtained by changing the pins as indicated in Figs. 15a to 18a. If the pins are arranged as shown in Figs. 15a and 17a in the order "pin space pin space", a standard type braid is obtained. If the pins are arranged as shown in Fig. 16a, namely, "pin pin space space", a fancy net is obtained, either flat or tubular. If the pins are arranged as shown in Fig. 18a, "pin pin pin space space space", a fancy double turn net is obtained. Other variations in the spacing and the pins will produce other designs.

General summary

It is therefore clear that the novel braiding machine is simple to operate, and that the movement of the carriers is readily controlled, and may be changed during the braiding operation. A desired design of braid may be obtained, or a color design may be braided by using carrier with threads of different colors, the pins being arranged in the regulator to properly guide the movements of the carriers. The described control may be used to produce novel effects not possible with standard type braiders. Thus, the removal of one carrier and the arrangement of the pins in a "pin, space" relation will produce two separate braids. Other novel effects may be obtained by suitable changes in the arrangements of the pins and the carriers.

While I have described a specific arrangement of braider parts for producing novel effects, it is evident that the control regulator may be adapted to other textile machines than braiders and that desired changes in the size and the relative arrangement of the parts, and in their operating, may be made to meet the requirements of textile manufacturing, within the spirit and the scope of the invention as defined in the appended claims.

I claim:—

1. A regulator mechanism for a braiding machine having carriers, intersecting raceways and movable switches therefor, comprising a rotatable member, a plurality of actuators adjustably positioned on said member, and raceway switch controlling mechanism operatable by said actuators upon rotation of said member, said switch controlling mechanism comprising a pivoted lever, a cam thereon actuatable by said actuators, and a link connecting said lever to the switches.

2. A regulator mechanism for a braiding machine having carriers, intersecting raceways and movable switches therefor, comprising a rotatable disk, a series of openings thereon, a series of pins removably mounted in said openings, and raceway switch controlling mechanism engageable by said pins, said switch controlling mechanism comprising a pivoted lever, a cam thereon actuatable by said pins, and a link connecting said lever to the switches.

3. A regulator mechanism for a braiding machine having carriers, intersecting raceways and movable switches therefor, comprising a disk, a series of openings thereon, a series of pins removably mounted in said openings, means for intermittently rotating said disk in timed relation to the carrier movement, and raceway switch controlling mechanism engageable by said pins, said switch controlling mechanism comprising a pivoted lever, a cam thereon actuatable by said pins, and a link connecting said lever to the switches.

4. In a braiding machine, a series of intersecting raceways, a plurality of carriers, carrier drivers for moving said carriers along said raceways, said drivers having shafts, intermeshing means for rotating said shafts and for producing a periodic dwell comprising gearing keyed to said shafts, an intermediate gear being mutilated.

5. In a braiding machine, a series of intersecting raceways, a plurality of carriers, carrier drivers for moving said carriers along said raceways, said drivers having shafts, intermeshing means for rotating said shafts and for producing a periodic dwell comprising gearing keyed to said shafts, an intermediate gear being mutilated, and means for moving the gear driven by said mutilated gear in a reverse direction upon unmeshing movement of said mutilated gear.

ARTHUR N. CLOUTIER.